United States Patent

Chaston et al.

(10) Patent No.: US 10,144,390 B1
(45) Date of Patent: Dec. 4, 2018

(54) WORK VEHICLE START SYSTEM AND METHOD WITH OPTICAL VERIFICATION FOR AUTHORIZING REMOTE START

(71) Applicant: Deere & Company, Moline, IL (US)

(72) Inventors: Keith N. Chaston, Dubuque, IA (US); Sean P. West, Dubuque, IA (US); Scott S. Hendron, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/597,569

(22) Filed: May 17, 2017

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *B60R 25/20* | (2013.01) |
| *B60R 25/24* | (2013.01) |

(Continued)

(52) U.S. Cl.
CPC .......... *B60R 25/209* (2013.01); *B60R 25/241* (2013.01); *B60R 25/305* (2013.01); *G05D 1/0038* (2013.01); *G06K 9/00791* (2013.01)

(58) Field of Classification Search
CPC ... B60R 25/009; B60R 25/214; B60R 25/305; G05D 1/0038; G06K 9/00791; G05B 19/00; H04N 7/18
USPC .............................. 701/2; 340/901; 348/148
See application file for complete search history.

(56) References Cited

U.S. PATENT DOCUMENTS

| 6,937,141 B2 | 8/2005 | Muramatsu |
| 7,283,810 B1 | 10/2007 | Arakawa et al. |

(Continued)

FOREIGN PATENT DOCUMENTS

| CN | 2884751 Y | 3/2007 |
| CN | 102722721 A | 10/2012 |

(Continued)

OTHER PUBLICATIONS

PRWeb, World Patent Marketing Invention Team Introduces the Heavy Equipment Remote Starting System, A Construction Equipment Invention That Will Save Time on Vehicle Operation, Jul. 27, 2016.

(Continued)

*Primary Examiner* — Mahmoud S Ismail
(74) *Attorney, Agent, or Firm* — Klintworth & Rozenblat IP LLP; Steven J. Wietrzny

(57) ABSTRACT

A remote start system for a work vehicle includes a communication unit configured to receive a remote start input signal; optical sensors providing a first image of the work vehicle or work vehicle environment; and a controller including at least a start module and a verification module. The start module is configured to generate a verification request in response to the remote start input signal. In response to the verification request, the verification module is configured to confirm that the first image satisfies a verification condition and to generate a verification confirmation when the first image satisfies the verification condition. The start module is configured to generate a start command in response to the verification confirmation. The remote start system further includes a starter device coupled to the controller and configured to energize a prime mover of the work vehicle upon receipt of the start command from the controller.

16 Claims, 9 Drawing Sheets

(51) Int. Cl.
    *B60R 25/30*     (2013.01)
    *G06K 9/00*     (2006.01)
    *G08G 1/00*     (2006.01)
    *H04N 7/18*     (2006.01)

(56) References Cited

U.S. PATENT DOCUMENTS

| | | | |
|---|---|---|---|
| 7,650,864 B2 | 1/2010 | Hassan et al. | |
| 8,228,177 B1 | 7/2012 | Yamada | |
| 8,836,538 B2 | 9/2014 | Ma et al. | |
| 9,007,462 B2 | 4/2015 | Mitsugi | |
| 9,132,806 B2 | 9/2015 | De Los Santos et al. | |
| 9,199,607 B2 | 12/2015 | Ohta et al. | |
| 2005/0195106 A1* | 9/2005 | Davis | B60R 25/00 342/357.31 |
| 2008/0117079 A1* | 5/2008 | Hassan | B60R 25/045 340/901 |
| 2012/0154591 A1* | 6/2012 | Baur | B60R 1/00 348/148 |
| 2013/0118447 A1 | 5/2013 | Martin et al. | |
| 2013/0131894 A1* | 5/2013 | Oakes | B60C 23/0418 701/2 |
| 2013/0146024 A1 | 6/2013 | Cunningham et al. | |
| 2014/0232869 A1 | 8/2014 | May et al. | |
| 2014/0293001 A1 | 10/2014 | Yu et al. | |
| 2016/0144857 A1 | 5/2016 | Ohshima | |
| 2017/0316254 A1* | 11/2017 | Hariri | G06K 9/00255 |

FOREIGN PATENT DOCUMENTS

| | | |
|---|---|---|
| CN | 102765365 A | 11/2012 |
| DE | 102008034606 A1 | 1/2010 |

OTHER PUBLICATIONS

Motortrend, Cars Are Now Part of Your Connected World—10 Things You Can Do With Your Car's Smartphone App, Nov. 11, 2015.

\* cited by examiner

WORK VEHICLE START SYSTEM AND METHOD WITH OPTICAL VERIFICATION FOR AUTHORIZING REMOTE START

STATEMENT OF FEDERALLY SPONSORED RESEARCH OR DEVELOPMENT

Not applicable.

CROSS-REFERENCE TO RELATED APPLICATION(S)

Not applicable.

FIELD OF THE DISCLOSURE

This disclosure relates to work vehicles and to remote starts of work vehicles.

BACKGROUND OF THE DISCLOSURE

In the construction, agriculture, mining, and forestry industries, many different types of work vehicles are operated to perform various tasks at work sites. The work sites may be located in relatively remote locations and/or in challenging climates. In some instances, starting the work vehicle at the beginning of a work shift may result in delays, for example, to properly warm the work vehicle. It would be advantageous if these delays could be avoided.

SUMMARY OF THE DISCLOSURE

The disclosure provides a system and method for operating a work vehicle with a remote start.

In one aspect, the disclosure provides a remote start system for a work vehicle. The remote start system includes a communication unit configured to receive a remote start input signal; one or more optical sensors providing at least a first image of at least a portion of the work vehicle or work vehicle environment; and a controller, with memory and processing architecture for executing vehicle control algorithms, coupled to the communication unit and the one or more optical sensors. The controller includes at least a start module and a verification module. The start module is configured to generate a verification request in response to the remote start input signal. In response to the verification request, the verification module is configured to confirm that the first image satisfies a verification condition and to generate a verification confirmation when the first image satisfies the verification condition. The start module is configured to generate a start command in response to the verification confirmation. The remote start system further includes a starter device coupled to the controller and configured to energize a prime mover of the work vehicle upon receipt of the start command from the controller.

In another aspect, the disclosure provides a remote start method for a work vehicle. The remote start method includes receiving, by a communication unit, a remote start input signal; capturing, by an optical sensor, an image that includes at least a portion of the work vehicle or work vehicle environment; confirming, by a controller, that the image satisfies a verification condition in response to the remote start input signal; generating, by the controller, a start command when the image satisfies the verification condition; and energizing, by a starter device, a prime mover of the work vehicle in response to the start command.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed system and method, as shown in the accompanying figures of the drawings described briefly above. Various modifications to the example embodiments may be contemplated by one of skill in the art.

The following describes one or more example implementations of the disclosed remote start systems and methods for operating a work vehicle, as shown in the accompanying figures of the drawings described briefly above. Generally, the disclosed systems and methods (and work vehicles in which they may be implemented) provide for improved efficiency, operation, and safety as compared to conventional systems.

Overview of Work Vehicle Environment

Figure 1:
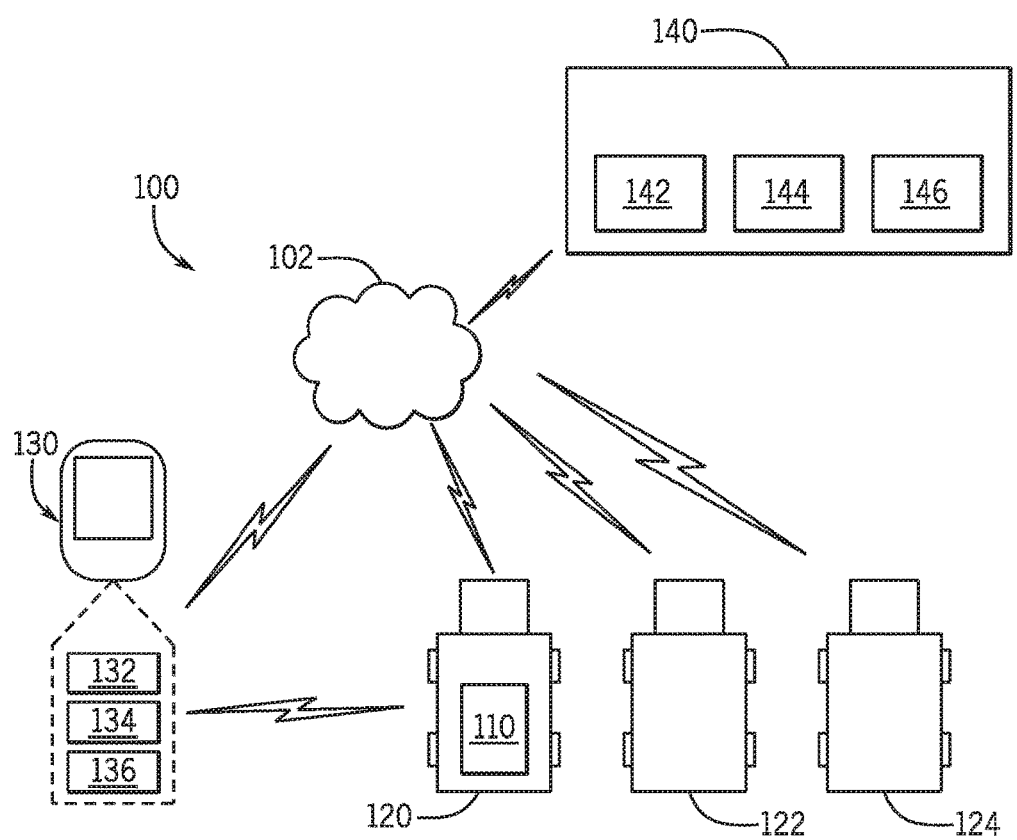
FIG. 1 is a schematic view of an environment in which the disclosed remote start system and method may be associated.

FIG. 1 is an example environment 100 in which a vehicle start system and method may be implemented. In particular, a vehicle start system 110 is depicted in FIG. 1 as being associated with a work vehicle 120, although one or more functions of the vehicle start system 110 may be performed by, or otherwise cooperate with, other elements of the environment 100. In some examples, the vehicle start system (or "start system") 110 may be considered a remote start system in that aspects or all of the start operation may occur when the vehicle operator is not in the vehicle 120.

As described in greater detail below, the start system 110 may interact with one or more additional work vehicles 122, 124, remote operation device 130, and remote center 140 to facilitate operation. Again, although depicted in work vehicle 120, in various embodiments, the start system 110 may be incorporated into other work vehicles 122, 124, remote operation device 130, or remote center 140; into more than one of the work vehicles 120, 122, 124, remote operation device 130, or remote center 140 (e.g., as a distributed system); or as a stand-alone system.

Generally, the other work vehicles 122, 124 may be considered in the context of the start system 110 as cooperating work vehicles 122, 124 or as part of a fleet of work vehicles with the work vehicle 120. The remote operation device 130 may be utilized by a future operator of the work vehicle 120 to remotely start and/or verify a remote start of the work vehicle 120. The remote center 140 may be utilized by a manager of the fleet of work vehicles 120, 122, 124 to remotely start or verify a remote start of the work vehicle 120 on behalf of a future operator. As such, the remote operation device 130 is discussed below with reference to an operator, and the remote center 140 is discussed below with reference to a manager, although in other embodiments, a manager may use the remote operation device 130 and an operator may use the remote center 140.

The elements of the environment 100 may wirelessly communicate with one another in any suitable manner, including directly (e.g., via Bluetooth, radio frequency signals, or the like) or via network 102. For example, the communication network 102 may utilize one or more of various communication techniques or mechanisms, including radio frequency, Wi-Fi, cellular, or the like. Further details about communication standards are provided below. The network 102 may include or otherwise cooperate with the JDLink™ system commercially available from Deere & Company of Moline, Illinois.

The work vehicle 120 may be any type of work vehicle, including an articulated dump truck described in greater detail below with reference to FIG. 2. In other applications, other configurations are also possible. For example, work vehicles in some embodiments may be configured as haulers or loaders, graders, or similar vehicles. Further, work vehicles may be configured as machines other than construction machines, including vehicles from the agriculture, forestry and mining industries, such as tractors, combines, harvesters, yarders, skylines, feller bunchers, and so on.

As introduced above, the work vehicle 120 may be part of a fleet with other vehicles 122, 124, two of which are shown in FIG. 1 as examples. The work vehicles 122, 124 may have separate start systems similar to the start system 110 described below and/or may interact with the start system 110 associated with work vehicle 120. The fleet of work vehicles 120, 122, 124 may be any type of work vehicles, including the same type or different types of work vehicles. Additional details will be provided below.

The start system 110 may interact with a remote operation device 130. Typically, the remote operation device 130 is associated with a future operator of the work vehicle 120 at a location remote from the work vehicle 120. Although not shown in detail, the remote operation device 130 may be any type of electronic device communicating with the start system 110, such as a tablet computing device, mobile or smart cellular phone, personal digital assistant, a laptop computing device, etc. In some cases, the remote operation device 130 may be stationary device, such as a terminal. In further examples, the remote operation device 130 may be incorporated into or otherwise located at the remote center 140 discussed below.

In one example, the remote operation device 130 includes a device controller 132, a device user interface 134 and a device communication component 136. The device controller 132 may be configured as a computing device with associated processor devices and memory architectures, as a hard-wired computing circuit (or circuits), as a programmable circuit, or otherwise. In some examples, the device controller 132 may be implemented on a mobile application executed by a mobile device. The device controller 132 is in communication with the device user interface 134 and the device communication component 136 over a suitable interconnection architecture or arrangement that facilitates transfer of data, commands, power, etc. In some examples, the device controller 132 may store a unique identifier associated with the remote operation device 130, and thus, the operator.

The device user interface 134 allows the operator or other user to interface with the remote operation device 130 (e.g. to input commands and data), and thus, other aspects of the environment 100. In one example, the device user interface 134 includes an input device and a display. The input device is any suitable device capable of receiving user input, including, but not limited to, a keyboard, a microphone, a touchscreen layer associated with the display, or other suitable device to receive data and/or commands from the user. Multiple input devices can also be utilized. The display comprises any suitable technology for displaying information, including, but not limited to, a liquid crystal display (LCD), light emitting diode (LED), organic light emitting diode (OLED), plasma, or a cathode ray tube (CRT). In some embodiments, the device user interface 134 may include output devices in addition to the display, including speakers and haptic actuators.

The device communication component 136 comprises any suitable system for receiving data from and transmitting data to the work vehicle 120, remote center 140, and start system 110. For example, the device communication component 136 may include a radio or suitable receiver configured to receive data transmitted by modulating a radio frequency (RF) signal via a cellular telephone network according to the long-term evolution (LTE) standard, although other techniques may be used. For example, the device communication component 136 may achieve bi-directional communications with the work vehicle 120, remote center 140, and/or start system 110 over Bluetooth® or by utilizing a Wi-Fi standard, i.e., one or more of the 802.11 standards as defined by the Institute of Electrical and Electronics Engineers ("IEEE"), as is well known to those skilled in the art. Thus, the device communication component 136 may include a Bluetooth® transceiver, a radio transceiver, a cellular transceiver, an LTE transceiver and/or a Wi-Fi transceiver. The device communication component 136 may employ various security protocols and techniques to ensure that appropriately secure communication takes place between the remote operation device 130 and the work vehicle 120, remote center 140, and/or start system 110.

As described below, the remote operation device 130 is generally configured to allow the operator to enable and disable the auto-start function of the start system 110. In some examples, the remote operation device 130 further enables the operator to initiate a remote start and/or to verify that a remote start is appropriate, and thus, to approve or deny an initiated remote start.

As introduced above, the start system 110 may further cooperate with the remote center 140, or in some embodiments, be implemented in the remote center 140. Alternatively, the remote center 140 may be omitted.

Generally, the remote center 140 includes a remote communication component 142, a remote center controller 144, and one or more remote data stores 146. The remote communication component 142 comprises any suitable system for receiving data from and transmitting data to the work vehicles 120, 122, 124, remote operation device 130, and start system 110, including those described above with reference to the device communication component 136. For example, the remote communication component 142 may achieve bi-directional communications with the work vehicles 120, 122, 124, remote operation device 130, and start system 110 over Bluetooth®, satellite, or by utilizing a Wi-Fi standard, i.e., one or more of the 802.11 standards. The remote communication component 142 may employ various security protocols and techniques to ensure that appropriately secure communication takes place between remote center 140 and the work vehicles 120, 122, 124, the remote operation device 130, and/or start system 110.

The remote center controller 144 is in communication with the remote communication component 142 and the one or more remote data stores 146 over a suitable interconnection architecture or arrangement that facilitates transfer of data, commands, power, etc. The remote center controller 144 may also be in communication with one or more remote users via a portal, such as a web-based portal. The remote center controller 144 may be configured as a computing device with associated processor devices and memory architectures, as a hard-wired computing circuit (or circuits), as a programmable circuit, or otherwise.

As noted above, in one embodiment, the remote center 140 may implement one or more aspects of the start system 110 described below, including providing requested or desired data for carrying out the associated functions. In further embodiments, the remote center 140 receives and stores data from the work vehicles 120, 122, 124, remote operation device 130, and start system 110, as well as from similar machines, devices, and systems from across a fleet or workforce. Additionally, the remote center 140 is generally configured to allow the manager to enable and disable the auto-start function of the start system 110. In some examples, the remote center 140 further enables the manager to initiate a remote start and/or to verify that a remote start is appropriate, and thus, to approve or deny an initiated remote start.

Overview of Example Work Vehicle

As noted above and now referring to FIG. 2, a start system 110 may be utilized with regard to various mobile work vehicles and other types of mobile machines, including the depicted articulated dump truck work vehicle 120 of FIG. 2. The work vehicle 120 is described below to provide examples of the various types of machine elements that may interact with the start system 110 and are described merely as reference for the more detailed discussions below. At times, the environment 100 of FIG. 1 is also referenced in the discussion below.

In one example, the work vehicle 120 includes a controller 200 (or multiple controllers) to control various aspects of the operation of the work vehicle 120. As described in greater detail below, one or more aspects of the start system 110 may be incorporated into the controller 200.

Generally, the controller 200 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 200 may be configured to execute various computational and control functionality with respect to the work vehicle 120 (or other machinery). In some embodiments, the controller 200 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 200 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 200 may be in electronic, hydraulic, mechanical, or other communication with various other systems or devices of the work vehicle 120 (or other machinery). For example, the controller 200 may be in electronic or hydraulic communication with various actuators, sensors, and other devices within (or outside of) the work vehicle 120, including various devices described below. The controller 200 may communicate with other systems or devices (including other controllers) in various known ways, including via a CAN bus (not shown) of the work vehicle 120, via wireless or hydraulic communication means, or otherwise. An example location for the controller 200 is depicted in FIG. 2. It will be understood, however, that other locations are possible including other locations on the work vehicle 120, or various remote locations.

In some embodiments, the controller 200 may be configured to receive input commands and to interface with an operator via the human-vehicle interface 210, which may be disposed inside a cab 220 of the work vehicle 120 for easy access by the operator. The human-vehicle interface 210 may be configured in a variety of ways. In some embodiments, the human-vehicle interface 210 may include an input device 212 with one or more joysticks, various switches or levers, one or more buttons, a touchscreen interface that may be overlaid on a display 214, a keyboard, a speaker, a microphone associated with a speech recognition system, or various other human-machine interface devices. The human-vehicle interface 210 also includes the display 214, which can be implemented as a flat panel display or other display type that is integrated with an instrument panel or console of the work vehicle 120. Those skilled in the art may realize other techniques to implement the display 214 in the work vehicle 120.

The work vehicle 120 further includes a vehicle communication component 216. The vehicle communication component 216 enables communication between the controller 200 and the remote operation device 130, remote center 140, and/or start system 110. The vehicle communication component 216 comprises any suitable system for receiving data from and transmitting data to the remote operation device 130, remote center 140, and/or start system 110, including those described above with reference to the device communication component 136. In one example, the vehicle communication component 216 achieves bi-directional communications with the remote operation device 130, remote center 140, and/or start system 110 over Bluetooth®, satellite or by utilizing a Wi-Fi standard, i.e., one or more of the 802.11 standards. The vehicle communication component 216 may employ various security protocols and techniques to ensure that appropriately secure communication takes place between the work vehicle 120 and the remote operation device 130, remote center 140, and/or start system 110.

As described in greater detail below, the controller 200 may facilitate the collection of various types of vehicle data associated with the work vehicle 120 to be evaluated by the start system 110. The vehicle data may be in the form of raw data from the applicable sensors described below (or other sources) or undergo some processing in the controller 200 in order to extract the desired characteristics. Further, the controller 200 may receive and implement commands from the start system 110, remote operation device 130, and remote center 140. Further details will be provided below.

As introduced above, the work vehicle 120 includes the cab 220 mounted on a vehicle frame 230. The cab 220 generally functions to house the operator and human-vehicle interface 210 during operation of the work vehicle 120.

In this example, the work vehicle 120 further includes a work tool, such as a load bin 232, mounted to the vehicle frame 230. It will be understood that the configuration of the work vehicle 120 having a work tool as the load bin 232 is presented as an example only. The load bin 232 defines a receptacle to receive a payload. One or more hydraulic cylinders 234 are mounted to the frame 230 and the load bin 232, such that the hydraulic cylinders 234 may be driven or actuated in order to pivot the load bin 232 about a pivot point. In other embodiments, work tools may include blades, forks, tillers, and mowers, as examples.

The work vehicle 120 includes a source of propulsion, such as an engine 240 that supplies power to a transmission 250. In one example, the engine 240 is an internal combustion engine, such as a diesel engine, that is controlled by the controller 200, which may include an engine control module, to enable start-up of the engine 240, enable shutdown of the engine 240, disable operation of the engine 240, and/or to modify some aspect of operation of the engine 240 or associated system, for example, based on input received from a human-vehicle interface 210, as well as based on commands from the start system 110. It should be noted that the use of an internal combustion engine is merely an example, as the propulsion device can be a fuel cell, an electric motor, a hybrid-gas electric motor, etc. The work vehicle 120 may include a fuel sensor 308 configured to determine the level of fuel available to the engine 240.

The transmission 250 transfers the power from the engine 240 to a suitable driveline coupled to one or more driven wheels 252 (or other type of traction mechanism) of the work vehicle 120 to enable the work vehicle 120 to move. As is known to one skilled in the art, the transmission 250 may include a suitable gear transmission operated in a variety of ranges containing one or more gears, including, but not limited to a park range, a neutral range, a reverse range, a drive range, a low range, etc. The transmission 250 may include one or more sensors 254 that measure one or more characteristics of the transmission 250, such as the status, pressure, or fluid level. Similarly, the wheels 252 may include tire pressure sensors 256. In one example, the transmission 250 is controlled by the controller 200, which may include a transmission control module, to enable or disable motion of the work vehicle 120, for example, based on input received from the human-vehicle interface 210, as well as based on commands from the start system 110.

The work vehicle 120 may include or otherwise cooperate with one or more starter devices 258. A starter device 258 may be, for example, an electromechanical device, such as a motor, that initiates operation of the internal combustion engine 240. As used herein, the starter device 258 may refer to any device or component that starts any aspect of the work vehicle 120.

The work vehicle 120 further includes an engine lubrication system 242 and/or an engine cooling system 244 that are associated with the engine 240 and/or other portions of the work vehicle 120. The lubrication system 242 and cooling system 244 may be controlled according to signals from the controller 200.

Generally, the engine lubrication system 242 circulates a liquid lubricant (e.g., engine oil) around engine 240 to lubricate various moving parts (e.g., pistons, cylinders, bearings) of engine 240. Although not shown in detail, the engine lubrication system 242 may include components such as an oil reservoir, sump, pan, conduits, and pumps to circulate the lubricant to and from the engine 240 and other applicable portions. In one example, the engine lubrication system 242 may include one or more sensors 246 to measure one or more lubrication system characteristics. In one example, the sensors 246 may include a temperature sensor to measure the temperature of the lubricant at one or more locations within the engine lubrication system 242. Other sensors 246 may include fluid pressure, flow, or quantity sensors. In one embodiment, controller 200 may receive temperature readings from one or more temperature sensors 246 and may control engine lubrication system 242 based on the temperature readings.

Similarly, the engine cooling system 244 circulates a liquid coolant (e.g., glycol, water) around engine 240 and other portions of the work vehicle 120, as desired, to control the temperature of engine 240. In one example, the engine cooling system 244 may include one or more sensors 248, including temperature sensors to measure the temperature of the coolant at one or more locations within the engine cooling system 244. Other sensors 248 may be provided, including sensors 246 such as fluid pressure, flow, or quantity sensors. In one embodiment, controller 200 may receive temperature readings from one or more temperature sensors 248 and may control engine cooling system 244 based on the temperature readings.

In some embodiments, the engine 240 may include an exhaust treatment system 260 to filter and treat the exhaust from the combustion process, including reducing pollutants into more acceptable forms. The exhaust treatment system 260 may include various components, including a unit that utilizes diesel exhaust fluid (DEF). The exhaust treatment system 260 may include one or more sensors 262, such as temperature, flow, pressure, or quantity sensors to collect information associated with the exhaust treatment system 260.

In further embodiments, the work vehicle 120 includes a power steering system 264 to assist the operator in maneuvering the work vehicle 120. A power steering system sensor 266 may be provided to collect information associated with the power steering system 264.

The work vehicle 120 also includes one or more hydraulic systems 270 with pumps, which may be driven by the engine 240 of the work vehicle 120. Flow from the pumps may be routed through various control valves and various conduits in order to drive the hydraulic cylinders, as well as various other components of the work vehicle 120. The flow through the hydraulic system 270 may be controlled in various ways (e.g., through control of the various control valves) according to commands from the controller 200 in order to cause movement of the hydraulic cylinders, and thus, movement of the load bin 232 (and/or other work tools) relative to the vehicle frame 230, for example, based on input received from the human-vehicle interface 210, as well as based on commands from the start system 110. Although not shown in detail, other aspects of the work vehicle 120 may be controlled with individual motors and the like with commands from the controller 200 based on input from the human-vehicle interface 210 and/or start system 110. Various sensors 276 may be associated with hydraulic system 270. The sensors 276 may be orientation, position, and/or status sensors to provide tool characteristic data.

The work vehicle 120 may also include one or more brake assemblies 280 that, upon actuation, stop one or more operational aspects of the work vehicle 120. As examples, the brake assemblies 182 may include a propulsion brake and/or parking brake to stop movement of the overall work vehicle 120 and/or a tool brake to stop movement of the work tool, (e.g., the load bin 232). The brake assemblies 182 may be actuated by a command from the controller 200, for example, based on input received from the human-vehicle interface 210, as well as based on commands from the start system 110. In one example, the brake assemblies 280 may be actuated by a stop command from the start system 110. As a result, in this context, the stop command may stop movement or operation of any system or component associated with the work vehicle 120, including the engine 240, transmission 250, or wheels 252 (e.g., to stop movement of the overall work vehicle 120), as well as the hydraulic system 270 (e.g., to stop movement of the work tool, such as the load bin 232). One or more brake sensors 282 may be provided to collect information associated with the brake assemblies 280.

The work vehicle 120 may further include a battery assembly 284 with one or more batteries that provide electrical power to the various components of the work vehicle 120, including the starter device 258. Other components powered by the battery assembly 284 may include various sensors (e.g., the sensors discussed herein), lighting assembly 294, vehicle communication component 216, and the like.

The battery assembly 284 may be considered to have a state of charge that represents the amount of electrical power that the battery assembly 284 is capable of providing at a particular time. The state of charge may be impacted by a number of factors, including battery usage and temperature. Typically, the battery assembly 284 is recharged upon operation of the engine 240 (e.g., in which mechanical energy is converted into electrical energy via an alternator). At a given time, the state of charge may be measured or otherwise determined by a battery sensor 286 that provides appropriate signals to the controller 200 and/or start system 110. The battery assembly 284 may be controlled by the controller 200 (and/or a battery management module) based on commands from the operator via the human-vehicle interface 210 and/or from the start system 110.

The work vehicle 120 may further include a climate control system 288 that functions to monitor a desired temperature in the cab 220. The climate control system 288 may include a heating arrangement and/or a cooling arrangement. The heating arrangement generally operates to deliver heated air to the cab 220, (e.g., from a separate heating element or from the engine 240). In one example, the cooling arrangement generally operates to deliver cooled air to the cab 220, such as air blown over a refrigerant within a refrigeration cycle. The climate control system 288 may be operated based on signals from the controller 200 and/or start system 110. In one example, the climate control system 288 may include one or more temperature sensors 298, including one or more temperature sensors within the cab to measure cab temperatures and/or one or more temperature sensors outside of the cab to measure ambient temperatures. Other components that may be considered part of the climate control system 288 include window and/or mirror defrosters, heated seats, heated steering wheel, and the like.

The various components of the work vehicle 120 may be housed by body compartments 292 positioned on the vehicle frame 230. Such body compartments 292 may include removable or openable panel doors that allow access to the associated component housed therein.

The work vehicle 120 may further include a lighting assembly 294 with one or more light sources. The light sources may include any light emitting device, such as a light bulb, light emitting diode (LED) array, and so on, which illuminates one or more portions of the user environment and/or surrounding environment based on one or more control signals from the controller 200.

Along with the sensor discussed above, additional sensors may also be provided to observe various conditions associated with the work vehicle 120. For example, various sensors 302 may be disposed on or near the frame 230 in order to measure position parameters, such as an incline or slope of the vehicle 120, and so on. In addition, various sensors 304 are disposed on or near the frame 230 in order to observe an orientation of the load bin 232 relative to the frame 230. Additionally, the work vehicle 120 may include one or more location or position sensors 300, such as a global positioning system (GPS) receiver, a LORAN system, a dead reckoning system, a cellular triangulation system, or other positioning system, that provide signals to the controller 200 and start system 110 to ascertain the location of the work vehicle 120. Such sensors 300 and associated systems may be considered to include, for example, mapping software or navigation software that generates desired maps, navigation routes and other geographic functions. The work vehicle 120 may also include a clock 306 that provides a time of day and a date.

In further embodiments, the work vehicle 120 may include one or more image sensors 310 that function to capture an image of the work vehicle 120 and/or the surrounding environment. As described below, the image sensor 310 may be part of an image system in which the captured images are analyzed and/or evaluated for various characteristics. The image sensor 310 may include one or more cameras, although other types of image sensors may be provided. In one embodiment, the image sensor 310 is positioned to capture an overhead or "bird's eye" view. This view provides a single, complete view of the work vehicle 120 and the immediately adjacent environment. In some embodiments, the image sensor 310 may include a servomotor that enables adjustment or repositioning. In some instances, the image sensor 310 may cooperate with the lighting assembly 294 to illuminate the view to be captured.

The work vehicle 120 may further include one or more proximity sensors 320, 322. Such sensors 320, 322 may be arranged on the work vehicle 120 to identify the presence or absence of objects surrounding the work vehicle 120. Any suitable type of proximity sensor 320, 322 may be provided, including optical sensors, infrared sensors, and radar or LIDAR systems. In this example, the proximity sensors 320, 322 are arranged on the front and the back of the work vehicle 120, although any positions may be provided.

The components of the work vehicle 120 will be used as examples in the discussion of the start system 110 provided below.

Work Vehicle Start Systems

Figure 3:
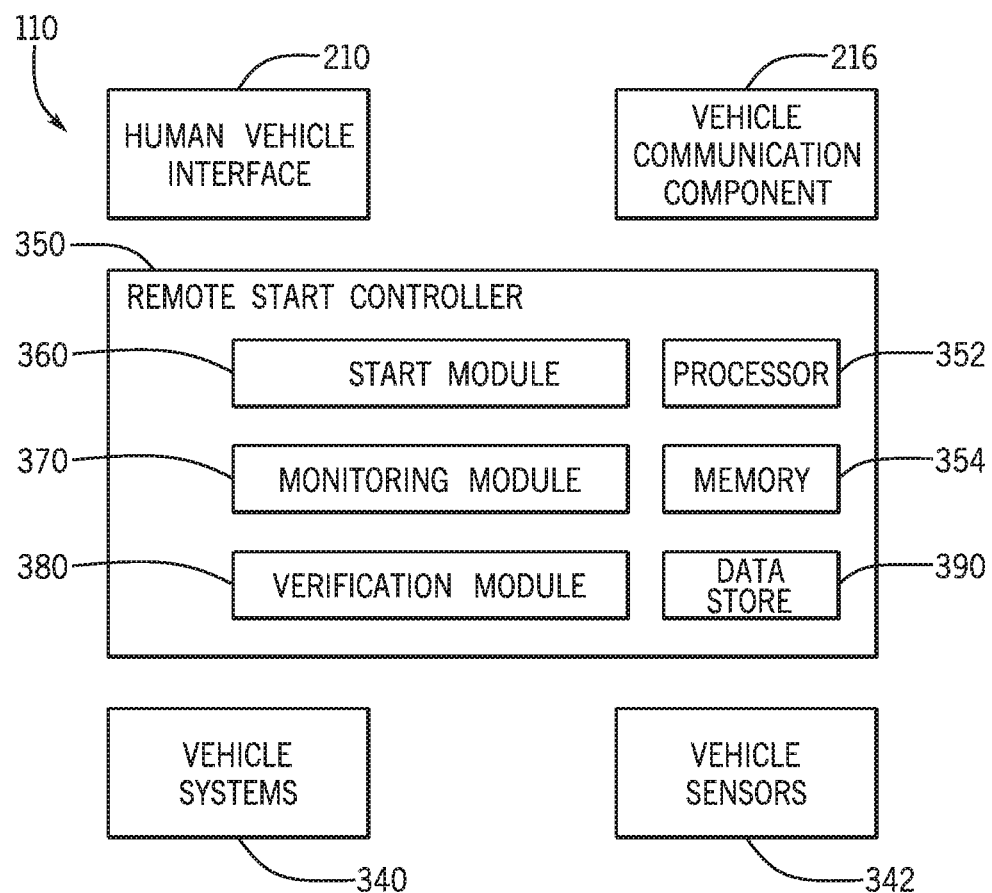
FIG. 3 is a schematic block diagram illustrating an example vehicle start system.

FIG. 3 is a simplified block diagram of the start system 110. Generally, the components of the start system 110 discussed in reference to FIG. 3 are on-board the work vehicle 120. In some embodiments, however, one or more functions may be performed on the remote operation device 130 and/or the remote center 140.

In one example, the start system 110 may be considered to include a start controller 350. Generally, the start controller 350 may control the overall operation of the start system 110 to initiate a remote start, either automatically or based on operator commands, and/or verifying that a remote start is appropriate, either automatically or based on operator or manager commands. The start controller 350 may be embedded within the work vehicle controller 200 discussed above, or the start controller 350 may be a stand-alone controller.

Generally, the start controller 350 may be configured as a computing device with associated processor devices and memory architectures, as a hard-wired computing circuit, as a programmable circuit, as a hydraulic, electrical or electro-hydraulic controller, or otherwise, which are generally represented in FIG. 3 as processor 352. As such, the start controller 350 may be configured to execute various computational and control functionality with respect to the start system 110, e.g., as programs stored in memory 354.

In one embodiment, the start system 110 may be considered to include, or otherwise interact with, the human-vehicle interface 210 and vehicle communication component 216 of the work vehicle 120, details of which are discussed above. In some examples, the user interface and communications unit associated with the start system 110 may be stand-alone or dedicated components with comparable functions. As noted above, human-vehicle interface 210 generally functions to enable an operator at the work vehicle 120 to interface with the start system 110 (e.g. to input commands and data and receive data and/or to enable or disable on or more aspects of the start system 110). The vehicle communication component 216 generally functions to enable communication between the start controller 350 and the work vehicle 120, remote operation device 130, and/or remote center 140.

The start system 110 may further be considered to include, or otherwise interact with, various work vehicle systems 340 and various work vehicle sensors 342. The vehicle systems 340 generically refers to any of the work vehicle components described above and/or work machine components generally incorporated into such work machines. Examples include the load bin 232, engine 240, transmission 250, starter devices 258, engine lubrication system 242, engine cooling system 244, exhaust treatment system 260, power steering system 264, hydraulic systems 270, brake assemblies 280, battery assembly 284, climate control system 288, body compartments 292, and lighting assembly 294. Similarly, the vehicle sensors 342 generically refers to any of the work machine sensors described above and/or work vehicle components generally incorporated into such work vehicles. Examples include the transmission sensors 254, tire pressure sensors 256, lubrication system sensors 246, cooling system sensors 248, exhaust treatment system sensors 262, power steering system sensor 266, hydraulic system sensors 276, brake sensors 282, battery sensor 286, temperature sensors 298, location or position sensors 300, frame sensors 302, clock 306, fuel sensor 308, image sensors 310, proximity sensors 320, 322, and any other suitable sensors. Communication between the start system 110 and the vehicle system 340 and vehicle sensors 342 may occur directly or via the vehicle controller 200.

As introduced above and described in greater detail below, the start controller 350 may particularly be configured to implement one or more functional units or modules, including a start module 360, a monitoring module 370, a verification module 380, and data store (or database) 390. As can be appreciated, the modules shown in FIG. 3 may be combined and/or further partitioned to similarly operate according to the functions described herein.

Generally, the start module 360 may be provided to control various aspects of the operation of the start system 110. The start module 360 may exchange information with the human-vehicle interface 210, vehicle communication component 216, vehicle systems 340, and/or vehicle sensors 342. The start module 360 may further initiate functions associated with the monitoring module 370 and/or verification module 380, and one or more of the modules 360, 370, 380 may retrieve or store information with data store 390.

In one embodiment, the start module 360 may receive signals from the human-vehicle interface 210 and/or vehicle communication component 216 to enable operation of the start system 110. Operation of the start system 110 may take a number of forms. In one example, the start module 360 initiates a monitoring or auto-start function in the monitoring module 370. The auto-start function may monitor characteristics of the work vehicle 110 when the work vehicle 110 in an "off-state" (e.g., when no other components or no major components of the work vehicle are active). In particular, the monitoring module 370 may receive information from the vehicle sensors 342 and/or other data sources, and when the information in the form of parameter values satisfies one or more start initiation conditions stored in data store 390, the monitoring module 370 may initiate a start initiation command provided to the start module 360. Upon receipt of the start initiation command, the start module 360 may generate the appropriate start actuation command for one or more of the vehicle systems 340. In some embodiments, monitoring module 370 may continue to monitor the information from the vehicle sensors 342, and when the information satisfies one or more stop initiation conditions stored in data store 390, the monitoring module 370 may initiate a stop initiation command that may be provided to the start module 360. Upon receipt of the stop initiation command, the start module 360 may generate the appropriate stop command for one or more of the vehicle systems 340.

In some embodiments, the start module 360 may receive the start initiation command directly from a remote operation device 130 and/or remote center 140 via the vehicle communication component 216. In any event, in other embodiments, upon receipt of the start initiation command, the start module 360 may initiate a verification function in the verification module 380. The verification module 380 may receive information from the vehicle sensors 342, and when the information satisfies one or more start conditions stored in data store 390, the verification module 380 may initiate a verification confirmation provided to the start module 360. Upon receipt of the verification confirmation, the start module 360 may generate the appropriate start command for one or more of the vehicle systems 340. In some examples, the verification module 380 may communicate with the remote center 140 and/or the remote operation device 130 via the vehicle communication component 216 in order to evaluate the verification conditions. Additional details and more specific implementations of the start system 110 are discussed below.

Figure 4:
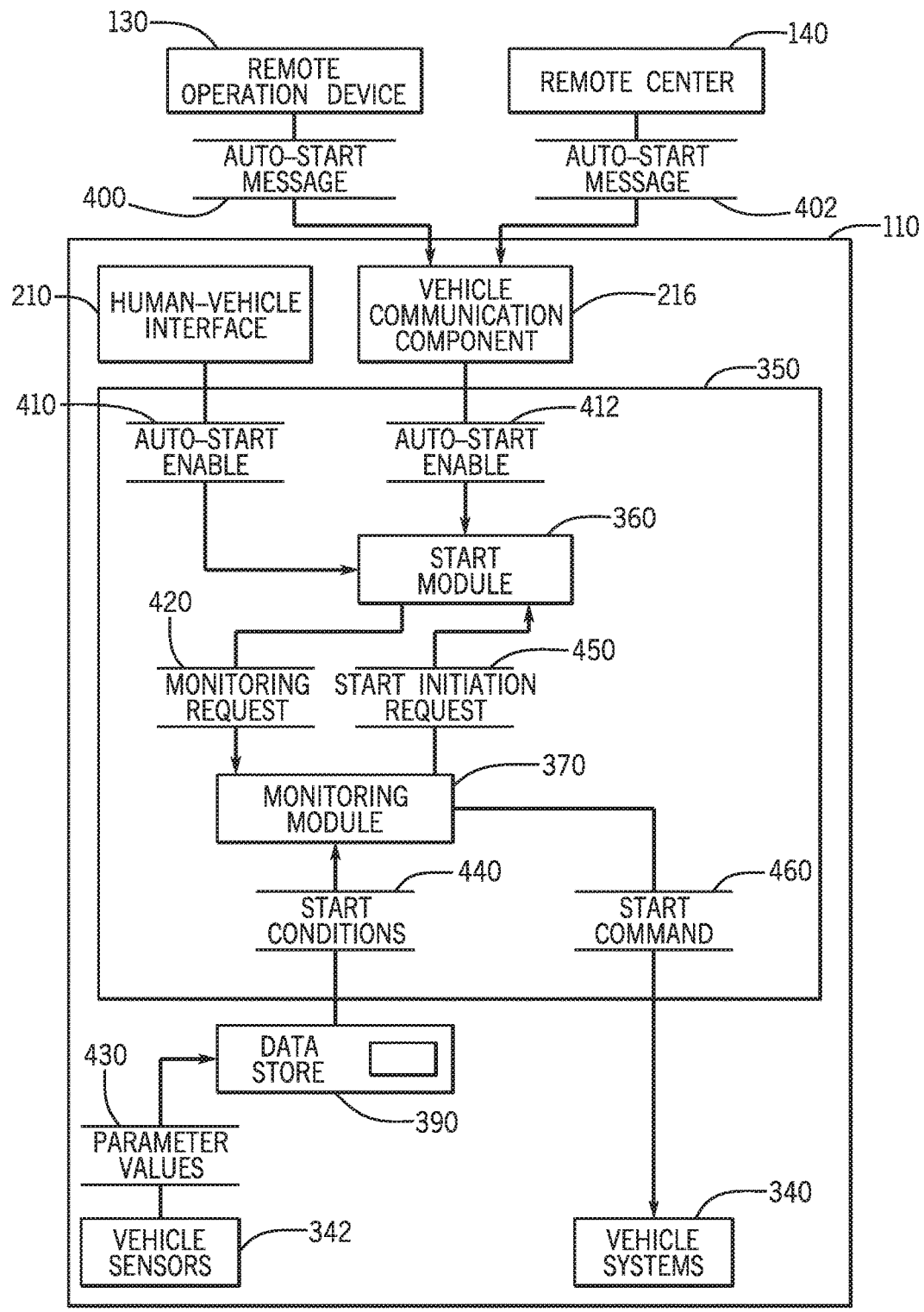
FIG. 4 is a detailed schematic block diagram of an example vehicle start system of FIG. 3 for implementing an automatic remote start of a work vehicle.

FIG. 4 is a schematic block diagram with data flows that illustrates various aspects of the start system 110 in the context of an automatic remote start implementation. In particular, as discussed below, the start system 110 monitors various parameter values to initiate an automatic start when one or more parameter values meet one of the remote start initiation conditions. In addition to the components discussed above with reference to FIG. 3, in this embodiment, the start system 110 may interact with one or more of the remote operation device 130 and/or the remote center 140.

Operation the start system 110 may be initiated in a number of ways. For example, the start module 360 may receive an auto-start enable signal 410 from the human-vehicle interface 210. This may occur, for example, when the operator in the work vehicle 120 is leaving for a period of time, but it is beneficial for the vehicle 120 to automatically start in his or her absence under certain conditions.

In some instances, initiation of the start system 110 may occur remotely, for example, from the remote operation device 130 and/or remote center 140. In particular, the remote operation device 130 and remote center 140 may send respective auto-start enable messages 400, 402 that are received by the vehicle communication component 216, which in turn, provides the auto-start enable messages 400, 402 directly to the start module 360 or, as shown, generates an auto-start enable signal 412 in response to the auto-start enable messages 400, 402.

Upon receipt of the auto-start enable signals 410, 412, the start module 360 generates a monitoring request 420 to the monitoring module 370. In response, the monitoring module 370 receives sensor signals representing parameter values 430 from one or more of the vehicle sensors 342 associated with the work vehicle 120. In some instances, the monitoring module 370 and/or start module 360 may generate the appropriate commands to provide power to the vehicle sensors 342 from the battery assembly 284 such that the vehicle sensors 342 may collect the appropriate information. The parameter values 430 may be associated with any relevant parameter, and more specific examples are provided below.

The monitoring module 370 may further retrieve one or more start initiation conditions (or start conditions) 440 that may be stored in data store 390. The start initiation conditions 440 generally represent the thresholds or values of certain parameters in which an automatic start operation is appropriate. The start initiation conditions 440 may have any applicable format, such as "for [vehicle parameter_n], if [parameter_value_n]>[parameter_threshold_n], then [start command_n]" or ""for [vehicle parameter_n], if [parameter_ value_n]<[parameter_threshold_n], then [start command_n]", depending on the nature of the parameter.

The monitoring module 370 evaluates the start initiation conditions 440 in view of the parameter values 430. If the parameter values 430 fail to satisfy the start initiation conditions 440, the monitoring module 370 takes no action and the monitoring continues until operation of the start system 110 is discontinued.

When one or more of the parameter values 430 satisfies one or more of the start initiation conditions 440, the monitoring module 370 may generate a start initiation request 450 for the start module 360. In response to the start initiation request 450, the start module 360 may generate a start command 460 for one or more of the vehicle systems 340. The type and nature of the start command 460 may be defined by the relevant start initiation condition 440. In some embodiments, the start module 360 may initiate a verification function prior to generating the start command 460, which is discussed in greater detail below.

In one example, the start command 460 may be for a starter device 258 to result in the energizing of a prime mover of the work vehicle 120. In this context, the prime mover may refer to one or more major components of the work vehicle 120, such as the engine 240, battery assembly 284, and/or load bin 232. Further examples are provided below. Upon issuance of the start command 460, the start module 360 may generate a message for the remote operation device 130 and/or remote center 140.

In some embodiments, prior to generating the start command 460 and/or as part of the start command 460, the start system 110 may provide "start warnings" for anyone that may be in the vicinity of the work vehicle 120. For example, the start system 110 may command the work vehicle horn to honk and lights to flash, and subsequently wait an acceptable amount of time prior to starting the engine 240.

In some examples, the parameter values 430 and/or start initiation condition 440 may be associated with operator comfort. In particular, the automatic start may function to precondition the cab 220 of the work vehicle 120 prior to the arrival of the operator. For example, the parameter values 430 from the vehicle sensors 342 may correspond to cab temperatures and/or ambient temperatures from the temperature sensor 298. When the parameter value 430 representing cab temperature and/or ambient temperature reaches a predetermined threshold of an associated start initiation condition 440, the start system 110 may generate the start command 460 to start one or more of the climate control system 288, the battery assembly 284, and/or engine 240 to cool and/or heat the cab 220. For example, in hot weather, the climate control system 288 may operate to cool the cab 220 when the temperature reaches an uncomfortable value, or in cold weather, the climate control system 288 may operate to heat the cab 220 when the temperature reaches an uncomfortable value. The battery assembly 284 and/or engine 240 may be energized to power the one or more aspects of the climate control system 288. As a result, the cab 220 of the work vehicle 120 may have a temperature appropriate for operator comfort when the operator arrives, thereby avoiding any delay in subsequent operation.

In some examples, the parameter values 430 and/or start initiation condition 440 may be associated with the battery assembly 284. In particular, the automatic start may function to ensure that the battery assembly 284 maintains a sufficient charge to start the vehicle 120. For example, the parameter value 430 from the vehicle sensors 342 may correspond to the state of charge of the battery assembly 284 from the battery sensor 286. When a state of charge value of the battery assembly 284 represented by the parameter value 430 reaches a predetermined threshold of an associated start initiation condition 440, the start system 110 may generate the start command 460 to start the engine 240. The operation of the engine 240 functions to charge the battery assembly 284, thereby preventing further decreases in the state of charge of the battery assembly 284 and the possibility that the battery assembly 284 will be insufficiently charged to start the engine 240 when the operator arrives.

In a similar example, the parameter value 430 may be time elapsed since last operation (e.g., the last start and/or since last shut-down) and the start initiation condition 440 may be a time threshold. As noted above, the clock 306 may be considered one of the vehicle sensors 342, while in other examples, the time elapsed may be determined internally in the start controller 350 and/or the work vehicle controller 200. The time threshold of the start initiation condition 440 may be selected to avoid the state of charge of the battery assembly 284 from dropping below an undesirably low value. In further examples, the time threshold of the start initiation condition 440 may be selected to provide regular circulation of the coolant and/or lubrication fluids through the engine 240 and other portions of the work vehicle 120.

In further examples, the parameter values 430 and/or start initiation conditions 440 may be associated with a schedule, work flow functions, and/or operational logistics. For example, the parameter value 430 may be receipt of an identification signal and the start initiation condition 440 may be the recognition of an identification signal associated with the intended operator of the work vehicle 120. As noted above, the remote operation device 130 associated with the operator may broadcast an identification signal received by one of the sensors 342 or the vehicle communication component 216 of the work vehicle 120 when the operator arrives at the work site. Upon receipt, the monitoring module 370 determines that the identification satisfies one of the start initiation conditions 440 (e.g., as the approved operator), and the start system 110 generates the start command 460. This automatic operation may function to prevent or mitigate any delays in operation when the operator is ready to begin work.

In a further example, the parameter value 430 may be receipt of an identification signal from a cooperating work vehicle and the start initiation condition 440 may be the recognition of the identification signal associated with the cooperating work vehicle. In this context, a cooperating work vehicle is a vehicle on which the operation of the respective work vehicle 120 is predicated. For example, the work vehicle 120 may be a dump truck, and the cooperating work vehicle may be a loader that loads the work vehicle 120 with material for transport. In this case, the work vehicle 120 has little or no function until arrival of the loader at a particular location.

Continuing this example, as introduced above, other work vehicles may broadcast an identification signal received by one of the sensors 342 or the vehicle communication component 216 of the work vehicle 120 when the cooperating work vehicle arrives at the work site. Upon receipt, the monitoring module 370 determines that the identification satisfies one of the start initiation conditions 440 (e.g., as the cooperating work vehicle), and the start system 110 generates the start command 460. This operation may function to prevent or mitigate delays in operation.

In a similar example, the start initiation conditions 440 may include or otherwise incorporate a work schedule in which the current time and day are represented in parameter values 430 that are compared to scheduled start times and days represented in the start initiation conditions 440. This enables the start system 110 to start the work vehicle 120 on a specific schedule.

Figure 5:
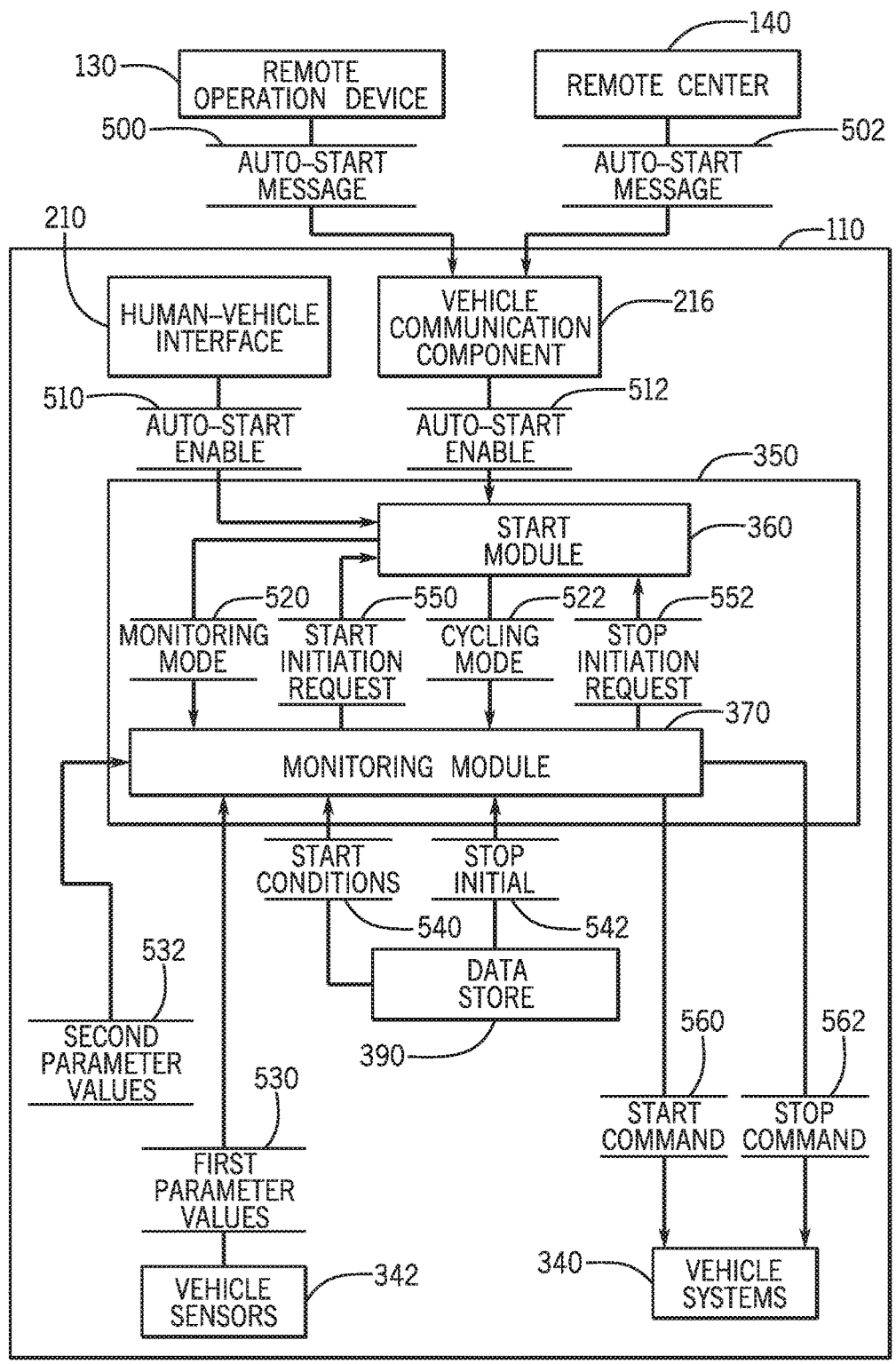
FIG. 5 is a detailed schematic block diagram of an example vehicle start system of FIG. 3 for implementing an automatic remote start of a work vehicle in cold temperature conditions.

FIG. 5 is a schematic block diagram with data flows that illustrates various aspects of the start system 110 in the context of a cold weather automatic cycling implementation. In particular, as discussed below, the start system 110 monitors various parameter values to initiate an automatic start when one or more parameter values meet one of the remote start initiation conditions and further to initiate an automatic stop when one or more parameters meet one of the remote stop initiation conditions.

As noted above, the implementation of FIG. 5 is generally associated with cold weather conditions that, if unaddressed, may delay or prevent a manual start by the operator at a later time. As an example, it may be undesirable to operate an engine 240 at very low temperatures. Such operation may result in condensation, emission, and/or efficiency issues. In some instances, one or more types of vehicle fluids may thicken or otherwise be compromised. Conventionally, when dealing with this type of issue, an operator may be required to "pre-heat" the engine 240 or other vehicle systems with an electric heater, thereby potentially resulting in operating delays. In some instances, such temperatures may require vehicle service if unaddressed. These types of issues are particularly relevant when an operator leaves a vehicle 120 at a work site overnight in cold climates. As such, the implementation of FIG. 5 may have sensor parameters and/or start initiation conditions associated with cold weather issues. More specific examples are discussed below.

Similar to the example of FIG. 4, operation the start system 110 of FIG. 5 may be initiated in a number of ways. For example, the start module 360 may receive an auto-start enable signal 510 from the human-vehicle interface 210. In some instances, initiation of the start system 110 may occur remotely, for example, from the remote operation device 130 and/or remote center 140. In some situations, the start system 110 may generate a preemptory message for the remote operation device 130 and/or remote center 140 as a reminder for the operator or manager of the availability of the auto-start function. Such a message may be generated, for example, based on weather forecasts and/or location coordinates.

In any event, the remote operation device 130 and remote center 140 may send respective auto-start enable messages 500, 502 received by the vehicle communication component 216, which in turn, provides the auto-start enable messages 500, 502 directly to the start module 360 or, as shown, generates a start enable signal 512 in response to the auto-start enable messages 500, 502.

Upon receipt of the auto-start enable signals 510, 512, the start module 360 generates a monitoring mode request 520 for the monitoring module 370. Upon generation of the monitoring mode request 520 for the monitoring module 370, the start module 360 (and/or the overall start system 110) may be considered to be operating in the "monitoring mode."

In response to the monitoring mode request 520, the monitoring module 370 receives sensor signals representing parameter values 530 from one or more of the vehicle sensors 342 associated with the work vehicle 120. In some instances, the monitoring module 370 and/or start module 360 may generate the appropriate commands to provide power to the vehicle sensors 342 from the battery assembly 284 such that the vehicle sensors 342 may collect the appropriate information.

Also in response to the monitoring mode request 520, the monitoring module 370 may further retrieve one or more start initiation conditions (or start conditions) 540 that may be stored in data store 390. As above, the start initiation conditions 540 generally represent the thresholds or values of certain parameters in which an automatic start operation is appropriate.

The monitoring module 370 evaluates the start initiation conditions 540 in view of the parameter values 530. If the parameter values 530 fail to satisfy the start initiation conditions 540, the monitoring module 370 takes no action and the monitoring continues until operation of the start system 110 is discontinued.

When one or more of the parameter values 530 satisfies one or more of the start initiation conditions 540, the monitoring module 370 may generate a start initiation request 550 for the start module 360. In response to the start initiation request 550, the start module 360 generates a start command 560 for one or more of the vehicle systems 340, such as a starter device 258 to result in the energizing of a prime mover of the work vehicle 120. In one example, the start command 560 functions to start the engine 240. In some embodiments, the start command 560 may include the application of an elevated load on the engine 240 or other auxiliary system to accelerate the warming of the engine 240. As introduced above and discussed in greater detail below, in some embodiments, the start module 360 may perform a verification function prior to generating the start command 560.

Upon generation of the start command 560 for the monitoring module 370, the start module 360 (and/or the overall start system 110) may be considered to be operating in the "cycling mode" (or "warming mode"). In the cycling mode, the start module 360 sends a cycling mode request 522 to the monitoring module 370.

Upon receipt of the cycling mode request 522, the monitoring module 370 receives second parameter values 532 from the vehicle sensors 342. The second parameter values 532 may be the same values at the first parameter values 530 discussed above, or the second parameter values 532 may be different from the first parameter values 530.

As introduced above, the remote start may result in starting the engine 240, and the engine 240 may be an internal combustion engine in which fuel is combusted to generate power. The combustion process results in heat, which in turn functions to maintain or raise the temperature of the relevant parameter of the start condition that initiated the remote start. For example, operating the engine 240 functions to raise the temperature of the coolant, lubricant, and/or other relevant parameter, thereby avoiding the situation in which the respective parameter falls below an undesirable temperature.

Also in response to the cycling mode request 522, the monitoring module 370 may further retrieve one or more stop initiation conditions (or stop conditions) 542 that may be stored in data store 390. The stop initiation conditions 542 generally represent the thresholds or values of certain parameters in which an automatic stop operation is appropriate. In particular, the stop initiation conditions 542 represent the thresholds at which the issues that initiated the start command have been sufficiently addressed and operation of the respective prime mover is no longer necessary. Examples will be discussed below.

As such, the monitoring module 370 evaluates the stop initiation conditions 542 in view of the second parameter values 532. If the parameter values 532 fail to satisfy the stop initiation conditions 542, the monitoring module 370 takes no action and the cycling mode continues.

When one or more of the parameter values 532 satisfies one or more of the stop initiation conditions 542, the monitoring module 370 may generate a stop initiation request 552 for the start module 360. In response to the stop initiation request 552, the start module 360 generates a stop command 562 for one or more of the vehicle systems 340, such as a starter device 258 to result in the de-energizing of a prime mover of the work vehicle 120. In one example, the stop command 562 functions to stop the engine 240. Upon issuing the stop command 562, the start module 360 (and/or start system 110) may return to operation in the monitoring mode, as described above.

As noted above, the implementation of the start system 110 in FIG. 5 is generally associated with cold weather conditions. As such, the automatic start may function to prevent the engine 240 or other vehicle element from becoming undesirably cold by operating of the engine 240, which creates heat from the combustion process, and stopping operation of the engine 240 when appropriate, thereby avoiding unnecessary idling time.

As an example, the first parameter values 530 from the vehicle sensors 342 may correspond to engine temperatures, lubricant temperatures, coolant temperatures, and/or ambient temperatures from one or more of the respective temperature sensors. When the first parameter values 530 representing such temperatures reach a predetermined threshold of an associated start initiation condition 540, the start system 110 may generate the start command 560 to start the engine 240 to avoid further decreases in temperature and/or to warm the respective vehicle element.

Similarly, the second parameter values 532 from the vehicle sensors 342 may correspond to the same (or different) engine temperatures, lubricant temperatures, coolant temperatures, and/or ambient temperatures. When the second parameter values 532 representing such temperatures reach a predetermined threshold of an associated stop initiation condition 542, the start system 110 may generate the stop command 562 to stop the engine 240. In particular, the threshold of the stop initiation condition 542 may represent the temperature at which heating is no longer necessary. In some cases, the second parameter values 543 may be a predetermined period of engine run time. In other embodiments, the threshold of the stop condition may be a function of weather conditions or schedule. For example, the threshold of the stop initiation conditions 542 may represent a temperature that is sufficiently warm enough to avoid further automatic starts in the monitoring mode until arrival of the operator and/or for an acceptable amount of time.

In the implementations of FIGS. 4 and 5, the start module 360 generates a start command (e.g., start command 460, 560) in response to a start initiation request (e.g., start initiation request 450, 550). In some embodiments, the start system 110 may verify that start conditions are appropriate prior to issuing the start command for the associated vehicle system 340. As described below, the start system 110 may perform a verification function regardless of the source of the start initiation request.

Figure 6:
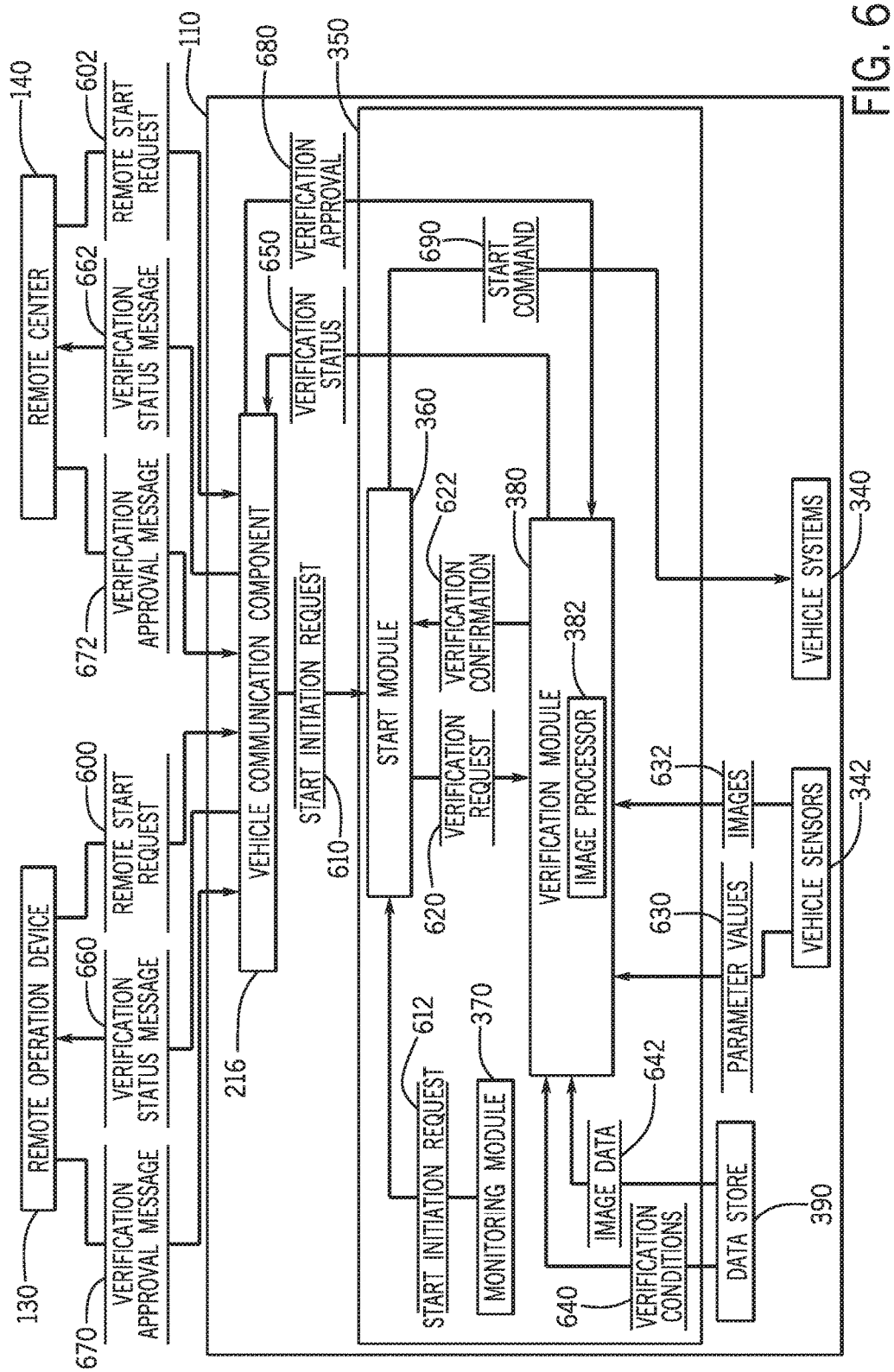
FIG. 6 is a detailed schematic block diagram of an example vehicle start system of FIG. 3 for implementing a verification of an initiated remote start of a work vehicle.

FIG. 6 is a schematic block diagram with data flows that illustrates various aspects of the start system 110 in the context of a verification that authorizes proceeding with a remote start operation. As in the examples of FIGS. 4 and 5, operation the start system 110 of FIG. 6 may be initiated in a number of ways.

In some instances, initiation of the start system 110 may occur remotely, for example, from the remote operation device 130 and/or remote center 140. In particular, the remote operation device 130 and remote center 140 may send respective remote start request messages 600, 602 that are received by the vehicle communication component 216, which in turn, provides the remote start request messages 600, 602 directly to the start module 360 or, as shown, generates a start initiation request 610 in response to the remote start request messages 600, 602.

Generally, the remote start request messages 600, 602 are "manual" requests for the work vehicle to start remotely from the requestor (e.g. the operator on the remote operation device 130 or manager in the remote center 140). Additionally, the monitoring module 370 may generate a start initiation request 612 in response to an auto-start function. For example, an operator may enable one or more auto-start functions such as those discussed above with reference to FIGS. 4 and 5. As such, the implementation of FIG. 6 may be used as an extension and/or variation to the implementations of FIG. 4 or FIG. 5.

In any event, upon receipt of a start initiation request 610, 612, the start module 360 generates a verification request 620 for the verification module 380. As noted above, the verification module 380 generally functions to verify that conditions are appropriate for continuing with the remote start.

The verification function of the verification module 380 may be performed in any suitable manner. In one embodiment, verification may be "manual," e.g., an auto-verification function is disabled and the verification is confirmed by an operator or other person. In a further embodiment, verification may be automated, e.g., an auto-verification function may be enabled. As noted above, the verification function operates to, in effect, authorize or permit the remote start to continue. Each of these two embodiments is discussed below.

In an embodiment in which auto-verification is disabled, in response to the verification request 620, the verification module 380 retrieves or otherwise receives sensor signals representing parameter values 630 from one or more of the vehicle sensors 342 associated with the work vehicle 120. The parameter values 630 may be predetermined, selected by an operator or manager, and/or defined by the verification conditions 640. In some instances, the monitoring module 370 and/or start module 360 may generate the appropriate commands to provide power to the vehicle sensors 342 from the battery assembly 284 such that the vehicle sensors 342 may collect the appropriate information.

Further, in response to the verification request 620, the verification module 380 retrieves or otherwise receives signals from the vehicle sensors 342 (e.g., image sensor 310) representing one or more images 632 of the work vehicle 120 and/or surrounding environment. In some situations, the verification module 380 may activate the lighting assembly 294 to illuminate an area to be captured by the image sensors 310, e.g., based on a time of day or ambient light available. In some embodiments, the verification module 380 may receive both parameter values 630 and the images 632, while in other embodiments, the verification module 380 may only receive the parameter values 630 or the images 632.

Upon receipt of the parameter values 630 and/or images 632, the verification module 380 generates a verification status 650 that is sent as one or more verification status messages 660, 662 by the vehicle communication component 216. Typically, the verification status messages 660, 662 are sent to the party that initiated the remote start request messages 600, 602. In other words, when the remote operation device 130 generated the remote start request message 600, the vehicle communication component 216 sends the verification status message 660 to the remote operation device 130; or when the remote center 140 generated the remote start request message 602, the vehicle communication component 216 sends the verification status message 662 to the remote center 140. In other embodiments, either of the remote operation device 130 or remote center 190 may be tasked with performing the verification function for all remote starts. In other words, even if the remote operation device 130 generated the remote start request message 600, the vehicle communication component 216 may send the verification status message 662 to the remote center 140; or even if the remote center 140 generated the remote start request message 602, the vehicle communication component 216 may send the verification status message 660 to the remote operation device 130.

In any event, the verification status message 660, 662 generally functions to present some aspect of the vehicle sensor parameters and/or images for review by the operator via the remote operation device 130 and/or by manager via the remote center 140 to determine if the conditions are appropriate for the work vehicle 120 to proceed with the remote start. Examples of the verification status messages 660, 662 are provided below with reference to FIGS. 7 and 8.

If the conditions are not appropriate, the operator or manager declines the remote start approval and the remote start is discontinued. If the conditions are acceptable, the operator or manager sends a verification approval message 670, 672 that is received by the vehicle communication component 216. In response, the vehicle communication component 216 generates a verification approval 680 that is received by the verification module 380.

Upon receipt of the verification approval 680, the verification module 380 generates a verification confirmation 622 for the start module 360. In response, the verification module 380 generates the start command 690 for the vehicle system 340, as discussed above in reference to FIGS. 4 and 5.

As noted above, in some embodiments, the start system 110, particularly the verification module 380, may have an auto-verification function that is enabled. In such an embodiment, the verification module 380 receives the verification request 620, and in response, the verification module 380 receives sensor signals representing parameter values 630 from one or more of the vehicle sensors 342 associated with the work vehicle 120. Also in response to the verification request 620, the verification module 380 may further retrieve one or more verification conditions 640 that may be stored in data store 390. The verification conditions 640 generally represent the thresholds or values of certain parameters in which continuing the remote start operation is appropriate.

The verification module 380 evaluates the verification conditions 640 in view of the parameter values 630. If the parameter values 630 fail to satisfy the verification conditions 640, the verification module 380 take no action and/or discontinues the remote start. In such a scenario, the verification module 380 and/or start module 360 may generate a message to the remote operation device 130 and/or remote center 140 indicating that the remote start was discontinued.

When one or more of the parameter values 630 satisfies one or more of the verification conditions 640, the verification module 380 may generate the verification confirmation 622 for the start module 360. As noted above, in response to the verification confirmation 622, the start module 360 generates a start command 690 for one or more of the vehicle systems 340, such as a starter device 258 to result in the energizing of a prime mover of the work vehicle 120. In one example, the start command 460 functions to start the engine 240.

In some embodiments, the verification module 380 may further (or alternatively) evaluate the verification conditions 640 in view of images 632 received from the vehicle sensor 342 and image data 642 received from data store 390. As an example, the verification module 380 may implement an image processor (or vision system) 382 to evaluate the images 632 in view of image data 642 and/or verification conditions 640. The image processor 382 may evaluate the images 632 in any suitable manner. In one embodiment, the image processor 382 may evaluate the images 632 with image recognition, e.g., by comparing the images 632 to acceptable images in the image data 634 in order to identify any conditions that should prevent proceeding with the remote start. In some examples, the acceptable images for comparison may be an image captured prior to the operator leaving for the day or the last image approved by the operator or manager. As noted above, this auto-verification function may be performed remotely or on the vehicle 120. Further examples are provided below.

Figure 7:
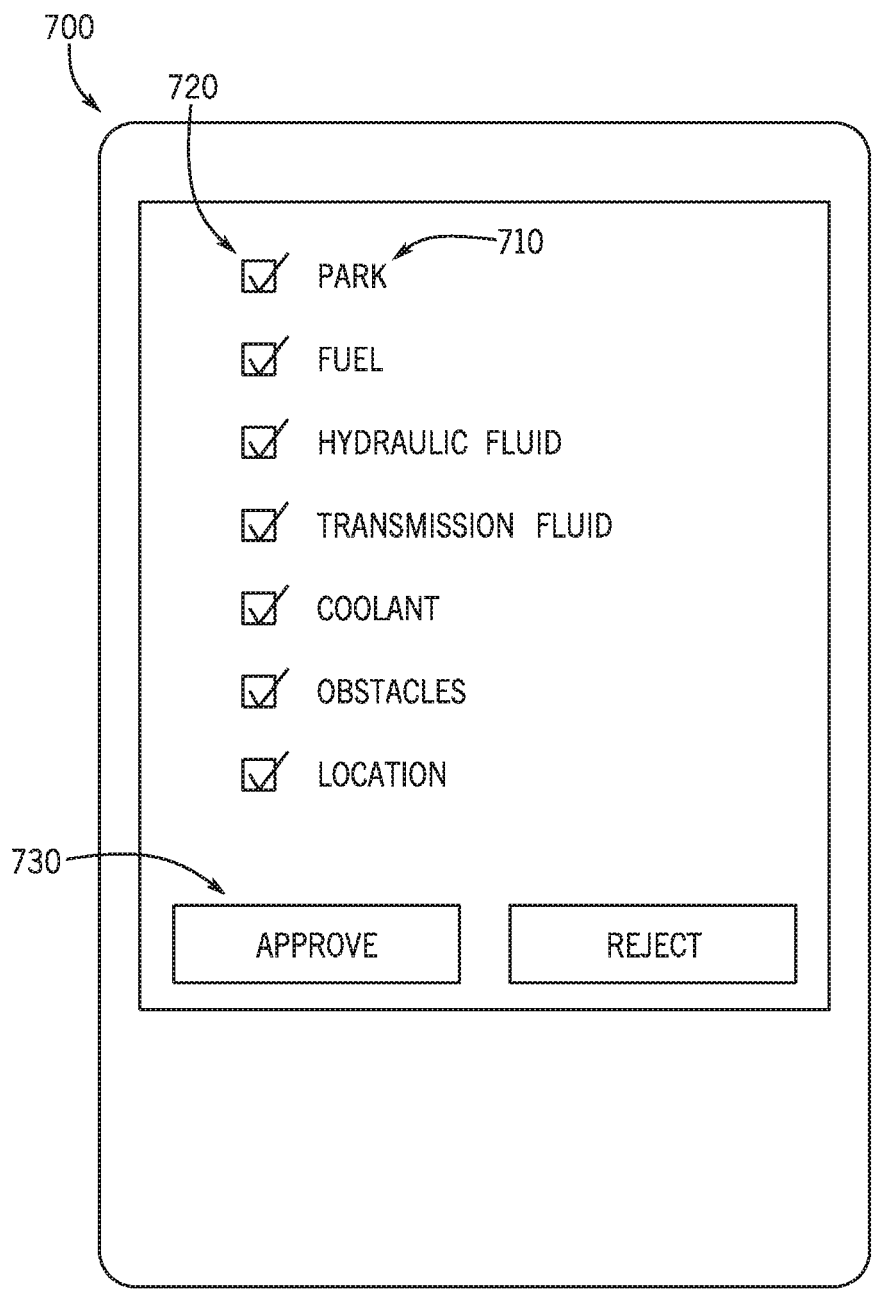
FIG. 7 is schematic representation of a verification interface display of an example vehicle start system of FIG. 3.
Figure 8:
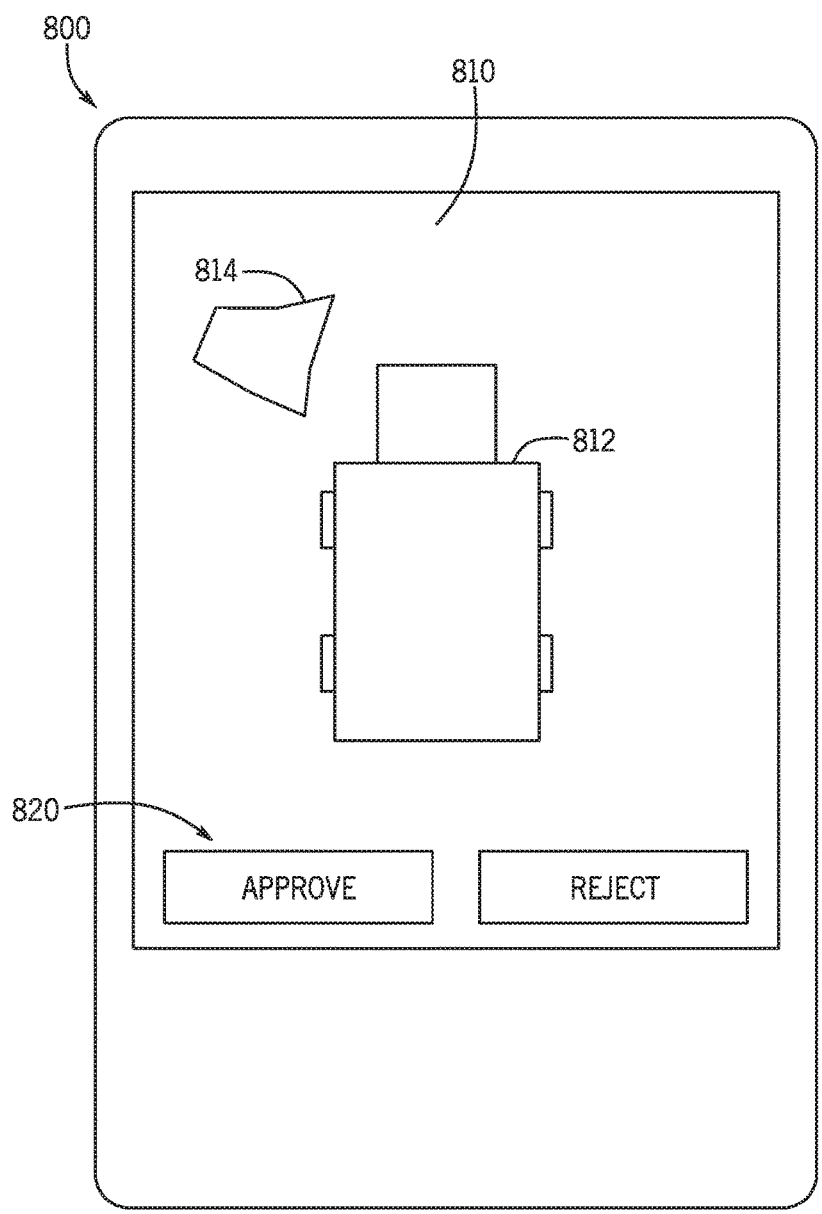
FIG. 8 is further schematic representation of a verification interface display of an example vehicle start system of FIG. 3.

As noted above, when the auto-verification function is disabled, the start system 110 may generate a verification status message 660, 662 for review by an operator via the remote operation device 130 and/or a manager at the remote center 140. FIGS. 7 and 8 provide examples of messages 700, 800 (e.g., corresponding to messages 660, 662 discussed above) may be provided to the operator or manager.

Referring to FIG. 7, the message 700 is in the form of an interface presenting a list of verification conditions 710 and statuses 720 corresponding to each condition 710. The verification conditions 710 may represent the conditions that an operator at the work vehicle 120 would review prior to starting the work vehicle 120. In effect, the verification conditions 710 represent a virtual "walk-around." In this example, the verification conditions 710 include transmission in park; fuel level is acceptable; hydraulic fluid level is acceptable; transmission fluid level is acceptable; coolant level is acceptable; no obstacles have been identified; and location is acceptable. The statuses 720 indicate that the associated parameter values (e.g., collected parameter values 630 from sensors 342) are within an acceptable range. In some embodiments, the statuses 720 may be in the form of a value for each condition 710 such that the operator or manager may independently evaluate the condition 710. The conditions 710 depicted in FIG. 7 are merely examples. Other conditions may be provided, and further examples are discussed below. If the conditions 710 and statuses 720 are considered acceptable by the operator or manager, the operator or manager may approve or reject the verification status message 700 via input interface 730 and generate a suitable message for the verification module 380, as discussed above.

Referring to FIG. 8, the message 800 is in the form of an interface presenting an image 810 of the work vehicle 812, as well as the surrounding environment. The image 810 enables an operator or manager to evaluate the condition or status of the work vehicle 812 and surrounding environment. For example, in the image 810 of FIG. 8, an obstacle 814 is near the work vehicle 812. If the operator or manager determines that the obstacle 814 is too close to the work vehicle 812, the operator or manager may reject the verification status message via input interface 830 to disable the remote start and send an appropriate message to the start system 110. Or, if the operator or manager determines that the obstacle 814 is not an issue for the work vehicle 812, the operator or manager may approve the verification status message via input interface 830, and the verification approval message 670, 672 is sent to the start system 110, as discussed above. In further embodiments, the image 810 of the work vehicle 120 enables the operator or manager to identify when one or more of the panels on the work vehicle 120 is open, thereby resulting in the remote start being inappropriate. In some examples, the operator may perform other functions within the message 800, such as requesting additional images, adjusting the angle of the images, zooming in or out, requesting the activation of the lighting assembly 294, and the like.

Various verification conditions considered by the start system 110 (either automatically or with the assistance from the operator or manager) are discussed above, including transmission in park; fuel level is acceptable; hydraulic fluid level is acceptable; transmission fluid level is acceptable; coolant level is acceptable; no obstacles have been identified; and location is acceptable. Other conditions include DEF level is acceptable; communication status is acceptable; and power steering status is acceptable. Further conditions include the angle, orientation, and/or position of the work tool, such as the load bin 232; the temperatures and/or pressures within the engine 240, transmission 250, engine cooling system 244, exhaust treatment system 260, power steering system 264, hydraulic systems 270, and/or brake assemblies 280; the charge of the battery assembly 284; the position or status of the various doors and latches that make up the various body compartments 292 of the vehicle 120; and/or, generally, equipment status. As noted above, other verification conditions may be associated with the location of the vehicle 120. For example, the start system 110 may verify that the vehicle 120 is at the work site or located at the work site in an appropriate work position, such as on a particular incline or orientation. As another example, the start system 110 may verify that the vehicle 120 is outside or otherwise not located within an enclosure. As another example, the start system 110 may verify that the vehicle 120 is not in the process of being transported and/or not already operating. Other conditions may be based on the particular type or function of the work machine 120.

Figure 2:
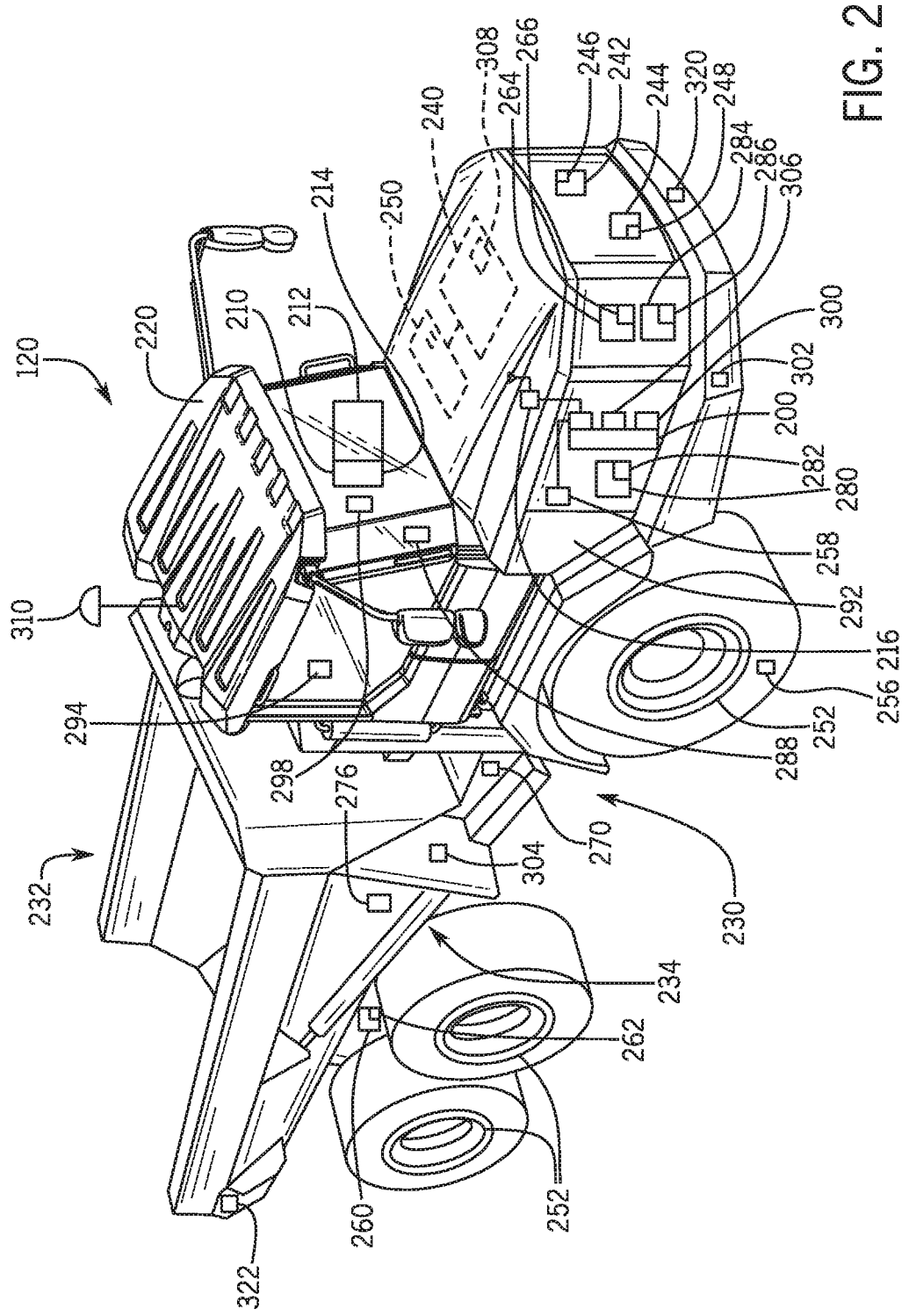
FIG. 2 is a schematic view of an example work vehicle in the form of a dump truck in which the remote start system and method may be implemented.
Figure 9:
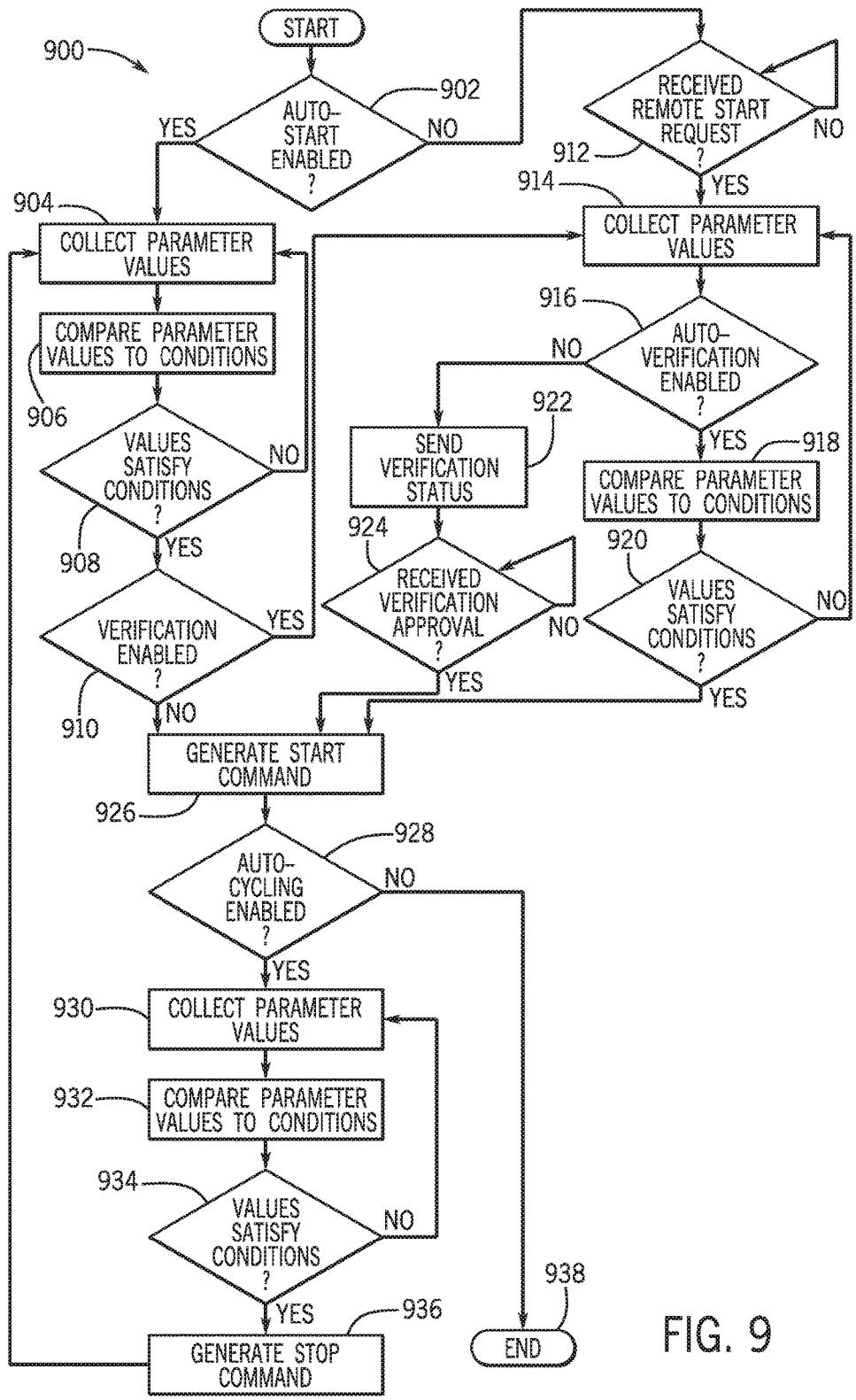
FIG. 9 is a flowchart illustrating an example vehicle start method of the disclosed system of FIG. 3 in accordance with one of various embodiments.

Referring now also to FIG. 9, as well with continuing reference to FIGS. 1-3, a flowchart illustrates a method 900 that may be performed by the start system 110 in accordance with the present disclosure. As can be appreciated in light of the disclosure, the order of operation within the method 900 is not limited to the sequential execution as illustrated in FIG. 9, but may be performed in one or more varying orders as applicable and in accordance with the present disclosure. Further one or more steps may be omitted and/or additional steps added.

In one example, the method 900 begins at step 902. In step 902, the start system 110 determines if the auto-start function is enabled, available, and/or otherwise present for the work machine 120. If the auto-start function is enabled, the method 900 proceeds to step 904 in which the start system 110 collects parameter values from the work vehicle 120.

In step 906, the start system 110 compares the parameter values to the start initiation conditions. In step 908, if one or more parameter values satisfy one or more of the start initiation conditions, the method 900 proceeds to step 910. In step 908, if the parameter values fail to satisfy the start initiation conditions, the method 900 returns to step 904.

In step 910, the start system 110 determines if the verification function is enabled, available, and/or otherwise present. When the verification function is enabled, the method 900 proceeds to step 914.

In step 914, the start system 110 collects parameter values from the work vehicle 120. In step 916, the start system 110 determines if the automatic verification function is enabled, available, and/or otherwise present. When the automatic verification function is enabled, the method 900 proceeds to step 918 in which the start system 110 compares the parameter values to the verification conditions. In step 920, if one or more parameter values satisfy one or more of the verification conditions, the method 900 proceeds to step 926. In step 920, if the parameter values fail to satisfy the verification conditions, the method 900 returns to step 914.

Returning to step 916, when the automatic verification function is not enabled, the method 900 proceeds to step 922. In step 922, the start system 110 sends a verification status to the operator or manager. In step 924, the start system 110 determines if a verification approval or confirmation from the operator or manager has been received. If the verification approval has been received, the method 900 proceeds to step 926; otherwise, the method 900 continues to wait for the verification approval.

Referring again to step 902, when the start system 110 determines that the auto-start function is not enabled, the method proceeds directly to step 912 in which the start system 110 determines if a remote start request has been received. If a remote start request has been received, the method 900 proceeds to step 914. If a remote start request has not been received, the method 900 continues step 912 until such a message is received.

Now referring to step 926, which may result from step 910, step 920, or step 924, the start system 110 generates a start command for a prime mover of the work vehicle 120, such as the engine. In some embodiments, the start system 110 may continue to collect parameter values (e.g., as in step 904 and step 914) and evaluate the parameter values in view of the conditions (e.g., as in step 906, 908 and steps 918, 920). In one example, the start system 110 may terminate the start command and/or generate a stop command based on the parameter values and conditions. This may be utilized, for example, when the particular parameters (e.g., some pressures and temperatures) may only be measured when the prime mover is operating, and subsequent evaluation in view the conditions may indicate that the start operation should be terminated. One example may be oil pressure, e.g., if after initiating the start operation, no oil pressure is present after a short amount of time, the operation is terminated.

If the start operation is terminated or otherwise fails to start under appropriate conditions, a notification may be sent to the operator, service personnel, and/or fleet manager. Similarly, if the start operation is successful, the start system may generate a confirmation notification and/or remote start count for the operator, service personnel, and/or fleet manager. If the start operation continues, the method 900 proceeds to step 928.

In step 928, the start system 110 determines if the auto-cycling function is enabled, available, and/or otherwise present. When the auto-cycling function is enabled, the method 900 proceeds to step 930 in which the start system 110 collects parameter values. In step 932, the start system 110 compares the parameter values to the stop initiation conditions. In step 934, if one or more parameter values satisfy one or more of the stop initiation conditions, the method 900 proceeds to step 936. In step 934, if the parameter values fail to satisfy the stop initiation conditions, the method 900 returns to step 930.

In step 936, the start system 110 generates a stop command for the prime mover. After step 936, the method 900 returns to step 904. If, in step 928, the auto-cycling function is not enabled, the method 900 ends at step 938.

Accordingly, the embodiments discussed above provide improved remote start systems and methods associated with a work machine. In particular, embodiments enable the collection and evaluation of vehicle parameters in view of conditions that define appropriate start situations relevant to the work machine. As such, exemplary embodiments improve operation, safety, and efficiency of a work vehicle.

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A remote start system for a work vehicle having one or more work tools, the remote start system comprising:
   a communication unit configured to receive a remote start input signal;
   one or more optical sensors capturing at least a first image providing a complete overhead view, including the one or more work tools of the work vehicle and adjacent work vehicle environment;
   a controller, with memory and processing architecture for executing vehicle control algorithms, coupled to the communication unit and the one or more optical sensors, the controller comprising at least a start module and a verification module, and
      wherein the start module is configured to generate a verification request in response to the remote start input signal,
      wherein, in response to the verification request, the verification module is configured to confirm that the first image satisfies a verification condition concerning the one or more work tools and to generate a verification confirmation when the first image satisfies the verification condition, and
      wherein the start module is configured to generate a start command in response to the verification confirmation; and
   a starter device coupled to the controller and configured to energize a prime mover of the work vehicle upon receipt of the start command from the controller.

2. The remote start system of claim 1, wherein the verification module is configured to confirm that the first image satisfies the verification condition by evaluating the first image with image recognition.

3. The remote start system of claim 1, wherein the verification module is configured to confirm that the first image satisfies the verification condition by comparing the first image to an acceptable image.

4. The remote start system of claim 1, wherein the verification module is configured to confirm that the first image satisfies the verification condition by evaluating the first image for environmental obstacles.

5. The remote start system of claim 1, wherein the verification module is configured to send the first image to a remote user via the communication unit as a verification status.

6. The remote start system of claim 5, wherein the communication unit is configured to receive a verification approval from the remote user, and wherein the verification module is configured to generate the verification confirmation upon receipt of the verification approval.

7. The remote start system of claim 5, wherein the verification module is configured to generate the verification status for rendering on a device of the remote user and to receive a verification approval from the device of the remote user upon approval of the verification status.

8. The remote start system of claim 1, wherein the verification module, upon receiving the verification request, is configured to activate an electrical system of the work vehicle to power the optical sensor and to initiate the capture of the first image by the one or more optical sensors.

9. The remote start system of claim 8, wherein the verification module is further configured to activate a lighting system to illuminate the portion of the work vehicle or the work vehicle environment.

10. The remote start system of claim 1, wherein the start module and the verification module are arranged on-board the work vehicle.

11. The remote start system of claim 1, wherein at least one of the start module or the verification module is remote relative to the work vehicle.

12. A remote start method for a work vehicle having one or more work tools, the method comprising the steps of:
receiving, by a communication unit, a remote start input signal;
capturing, by an optical sensor, an image that provides a complete overhead view, including the one or more work tools of the work vehicle and adjacent work vehicle environment;
confirming, by a controller, that the image satisfies a verification condition concerning the one more work tools in response to the remote start input signal;
generating, by the controller, a start command when the image satisfies the verification condition; and
energizing, by a starter device, a prime mover of the work vehicle in response to the start command.

13. The remote start method of claim 12, wherein the confirming step includes evaluating the image with image recognition.

14. The remote start method of claim 12, wherein the confirming step includes sending the image to a remote user via the communication unit and receiving an image approval from the remote user to satisfy the verification condition.

15. The remote start method of claim 12, further comprising:
activating, by the controller upon receiving the remote start input signal, an electrical system of the work vehicle to power the optical sensor and to initiate the capturing of the image by the optical sensor.

16. The remote start method of claim 15, further comprising:
activating, by the controller upon receiving the remote start input signal, a lighting system to illuminate the portion of the work vehicle or work vehicle environment.

* * * * *

UNITED STATES PATENT AND TRADEMARK OFFICE
CERTIFICATE OF CORRECTION

PATENT NO. : 10,144,390 B1
APPLICATION NO. : 15/597569
DATED : December 4, 2018
INVENTOR(S) : Chaston et al.

Page 1 of 1

It is certified that error appears in the above-identified patent and that said Letters Patent is hereby corrected as shown below:

In the Claims

In Column 28, in Claim 12, Line 2, delete "one more" and insert -- one or more --, therefor.

Signed and Sealed this
Twelfth Day of March, 2019

Andrei Iancu
*Director of the United States Patent and Trademark Office*